United States Patent
Tada et al.

(10) Patent No.: US 6,252,563 B1
(45) Date of Patent: Jun. 26, 2001

(54) COORDINATE INPUT APPARATUS, COORDINATE INPUT METHOD AND COMPUTER-READABLE RECORDING MEDIUM INCLUDING A COORDINATE INPUT CONTROL PROGRAM RECORDED THEREIN

(75) Inventors: Noburu Tada, Yamatokoriyama; Shuzo Kugimiya; Yoshihiro Wada, both of Nara, all of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/063,432

(22) Filed: Apr. 21, 1998

(30) Foreign Application Priority Data

Jun. 26, 1997 (JP) .................................................. 9-169879
Jul. 29, 1997 (JP) .................................................. 9-202793

(51) Int. Cl.$^7$ ........................................................ G09G 3/00
(52) U.S. Cl. ............................. 345/1; 345/173; 345/179; 178/18.01; 178/19.01; 178/19.02; 178/19.04
(58) Field of Search ............................ 345/173, 179, 345/1; 178/18.1, 18.3, 18.4, 18.6, 18.7, 19.1, 19.2, 19.3; 382/186

(56) References Cited

U.S. PATENT DOCUMENTS

| | | | |
|---|---|---|---|
| 5,016,008 | * 5/1991 | Gruaz et al. | 345/173 |
| 5,561,447 | * 10/1996 | Suzuki et al. | 345/179 |
| 5,594,810 | * 1/1997 | Gourdol | 382/186 |
| 5,777,605 | * 7/1998 | Yoshinobu et al. | 345/173 |
| 5,821,930 | * 10/1998 | Hansen | 345/173 |
| 5,831,599 | * 11/1998 | Inoue | 345/173 |
| 5,862,049 | * 1/1999 | Sato et al. | 345/179 |

FOREIGN PATENT DOCUMENTS 6-44001   2/1994   (JP) .

\* cited by examiner

*Primary Examiner*—Bipin Shalwala
*Assistant Examiner*—Vincent E. Kovalick
(74) *Attorney, Agent, or Firm*—Nixon & Vanderhye P.C.

(57) ABSTRACT

An object of the present invention is to make it possible to input coordinate information continuously among a plurality of input faces in inputting such coordinate information from the plurality of input faces by specifying coordinate positions. When a time measured between an end of a first input on the first input face and a start of a second input on the second input face is within a predetermined time, the first and second inputs are recognized as one continuous input even if the first input is stopped. Furthermore, when the end position of the first input is within a predetermined region, the first and second inputs are recognized as one continuous input even if the first input is stopped. Accordingly, it becomes possible to make a series of inputs by using the plurality of input faces.

9 Claims, 9 Drawing Sheets

COORDINATE INPUT APPARATUS, COORDINATE INPUT METHOD AND COMPUTER-READABLE RECORDING MEDIUM INCLUDING A COORDINATE INPUT CONTROL PROGRAM RECORDED THEREIN

BACKGROUND OF THE INVENTION

1. Field of the Invention

The present invention relates to a coordinate input apparatus applied to portable information processing terminals such as an electronic pocketbook comprising a plurality of display integrated tablets in each of which a display and an input device are integrated, a coordinate input method, and a computer-readable recording medium including a coordinate input control program recorded therein.

2. Description of the Related Art

Hitherto, an apparatus such as an electronic pocketbook having independent two screens is arranged such that, when it comprises display integrated tablets and adopts a pen input apparatus, it can specify a move or the like within one screen. However, in the case of moving to the other screen, a pen must be separated from the one screen once, so that it is judged that an end of move has been specified at the moment when the pen is separated from the screen.

Therefore, it has been necessary to specify a region of one screen at first to execute operations such as copying and moving and then to specify a region of the other screen to execute respective operations in specifying the regions ranging across the two screens, thus obliging such very cumbersome operations.

Figure 9:
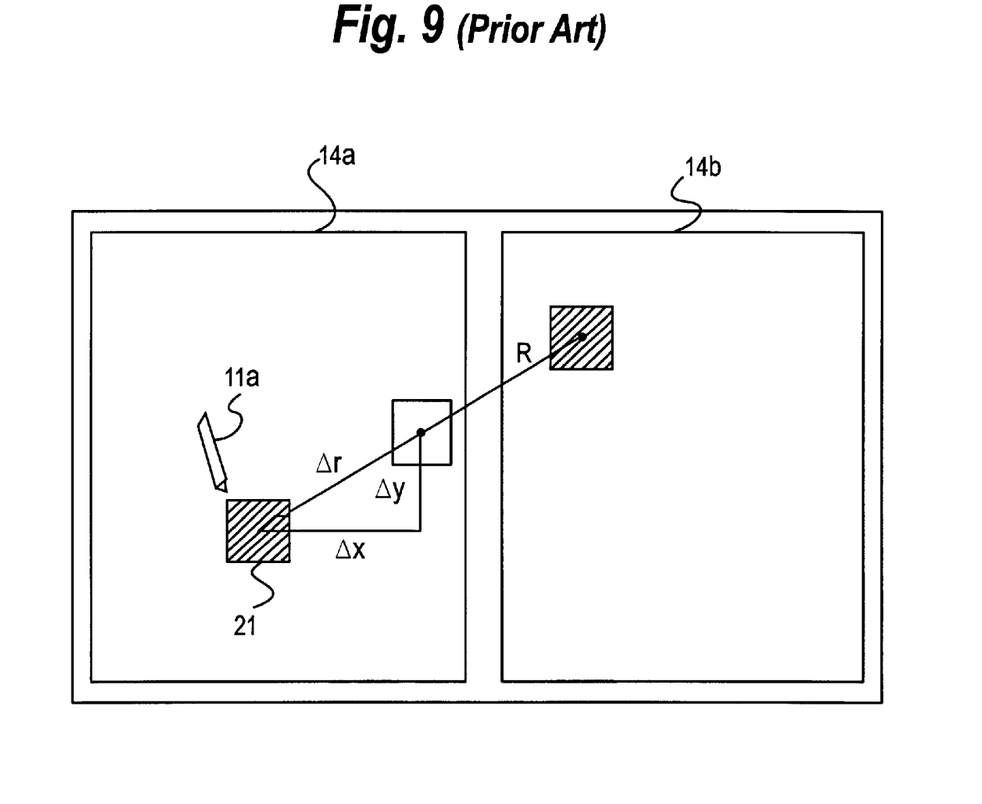
FIG. 9 shows an example of display of the prior art information processing terminal.

In order to solve such problem, Japanese Unexamined Patent Publication JP-A 6-44001(1994) discloses an apparatus for detecting a moving direction and a moving speed of an icon 21 displayed on display screens 14a and 14b of an apparatus as shown in FIG. 9 and for allowing the icon 21 to move between the display screens 14a and 14b by moving it in the moving direction further by a predetermined distance R when the moving speed of the icon is faster than a predetermined speed at the moment when the specification of the move is finished, i.e. a pen 11a is separated from the icon 21 (the face of a tablet).

However, although the invention disclosed in JP-A 6-44001(1994) allows the icon or a window frame to move across the two screens, it is unable to operate the pen continuously from one screen to the next screen in processing information which is displayed across the two screens and continues from one screen to the next screen such as a selection of a range.

SUMMARY OF THE INVENTION

It is an object of the present invention to provide a coordinate input apparatus which allows to input coordinate information of a plurality of input faces continuously among the plurality of input faces by specifying coordinate positions, a method for inputting a coordinate and a computer-readable recording medium including a coordinate input control program recorded therein.

In a first aspect of the invention, a coordinate input apparatus for inputting coordinate information of a plurality of input faces by specifying coordinate positions comprises:

time measuring means for measuring a time from an end of a first input on a first input face to a start of a second input on a second input face;

judging means for judging whether or not the time measured by the time measuring means is within a predetermined time; and input control means for recognizing the first and second inputs as one continuous input when the time is judged to be within the predetermined time by the judging means.

In a second aspect of the invention, a coordinate input apparatus for inputting coordinate information of a plurality of input faces by specifying coordinate positions comprises:

judging means for judging whether or not a position where a first input has been ended on a first input face is within a predetermined region; and input control means for recognizing the first input and a second input following the first input, on a second input face as one continuous input when the position where the first input has been ended is determined to be within the predetermined region by the judging means.

In a third aspect of the invention, a coordinate input method for inputting coordinate information of a plurality of input faces by specifying coordinate positions comprises the steps of:

measuring a time from an end of a first input on a first input face to a start of a second input on a second input face;

judging whether or not the time measured at the time measuring step is within a predetermined time; and controlling the input by recognizing the first and second inputs as one continuous input when the time is judged to be within the predetermined time at the judging step.

In a fourth aspect of the invention, a coordinate input method for inputting coordinate information of a plurality of input faces by specifying coordinate positions comprises the steps of:

judging whether or not a position where a first input has been ended on a first input face is within a predetermined region; and controlling the input by recognizing the first input and a second input following the first input, on a second input face as one continuous input when the position where the first input has been ended is determined to be within the predetermined region at the judging step.

In a fifth aspect of the invention, a computer-readable recording medium comprising a coordinate input control program recorded therein for causing a computer in which coordinate information of a plurality of input faces can be inputted by specifying coordinate positions, to execute:

a time measuring procedure of measuring a time from an end of a first input on a first input face to a start of a second input on a second input face;

a judging procedure of judging whether or not the time measured in the time measuring procedure is within a predetermined time; and an input controlling procedure of controlling the input by recognizing the first and second inputs as one continuous input when the time is judged to be within the predetermined time in the judging procedure.

In a sixth aspect of the invention, a computer-readable recording medium including a coordinate input control program recorded therein for causing a computer in which coordinate information of a plurality of input faces can be inputted by specifying coordinate positions, to execute:

a judging procedure of judging whether or not a position where a first input has been ended on a first input face is within a predetermined region; and an input controlling procedure of controlling the input by recognizing the first input and a second input following the first input, on a second input face as one continuous input when the position where the first input has been ended is determined to be within the predetermined region in the judging procedure.

According to the first, third and fifth aspects of the invention, when the measured time is within the predetermined time, the fist and second inputs are recognized as one continuous input even if the first input is stopped.

According to the second, fourth and sixth aspects of the invention, when the position where the first input is ended is within the predetermined region, the first and second inputs are recognized as one continuous input even if the first input is stopped.

Accordingly, it becomes possible to make a series of inputs by using a plurality of input faces. Thereby, it becomes possible to select a screen range straddling two screens, for example, allowing an operation performance to be remarkably improved.

BRIEF DESCRIPTION OF THE DRAWINGS

Other and further objects, features, and advantages of the invention will be more explicit from the following detailed description taken with reference to the drawings wherein:

FIG. 2 is a flowchart showing coordinate input processing operations of the information processing terminal 31a;

FIG. 3 is a block diagram showing a detailed structure of the information processing terminal 31a;

FIG. 4 shows an example of display of the information processing terminal 31a;

DETAILED DESCRIPTION OF THE PREFERRED EMBODIMENTS

Now referring to the drawings, preferred embodiments of the invention are described below.

A first embodiment of the present invention will be explained below in detail.

Figure 1:
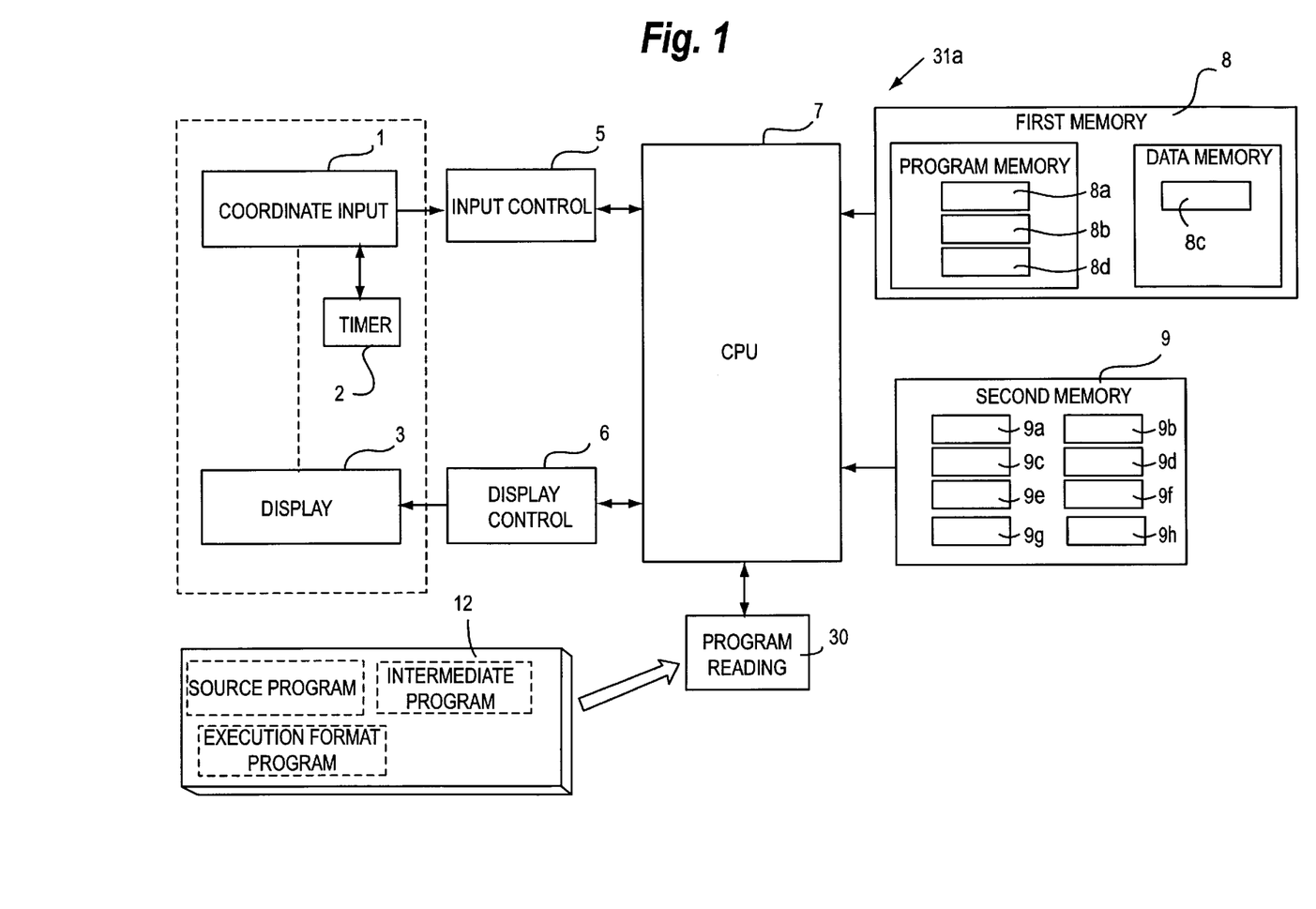
FIG. 1 is a block diagram showing a structure of an information processing terminal 31a according to a first embodiment of the present invention.

FIG. 1 is a block diagram showing a structure of an information processing terminal 31a according to the present invention. A coordinate input section 1 of the information processing terminal 31a is composed of tablets, for example, and is arranged so that coordinate information is inputted by touching a touch pen with faces of the tablets. It is constructed in a body with a display section 3.

A timer 2 is activated by the coordinate input section 1 and measures a time from the point of time when a pen input has been finished. That is, it starts to measure the time from a moment when the pen has been separated from the coordinate input section 1.

Figure 4:
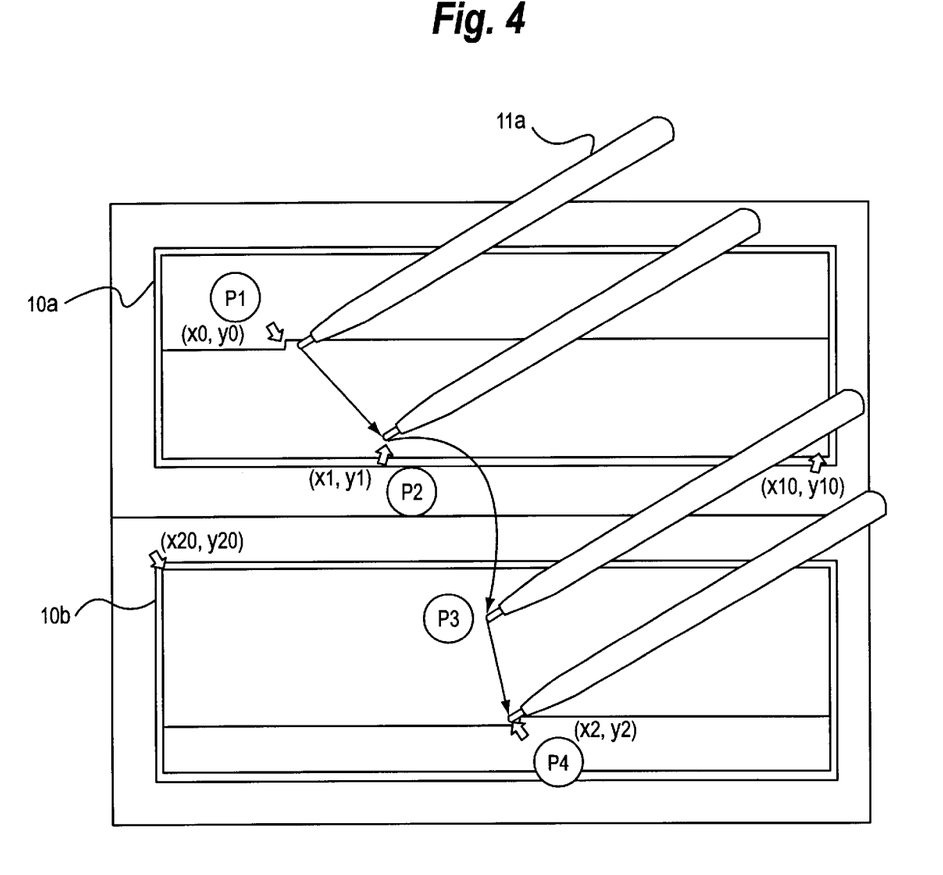

The display section 3 is composed of a LCD (liquid crystal display), for example, and is used to display various data. It is constructed in a body with the coordinate input section 1 as described above. The display section 3 comprises two display screens 10a and 10b as shown in FIG. 4. Input faces are set on the display screens 10a and 10b, respectively.

An input control section 5 controls input of coordinate information from the coordinate input section 1 under the control of a CPU 7. A display control section 6 controls display on the display section 3 under the control of the CPU 7. The CPU 7 controls and manages the whole apparatus. Information necessary for the control of the present invention is stored in first and second memories 8 and 9, respectively.

The first memory 8 is divided into a program memory and a data memory. A range selection control program 8a, a comparison program 8b and other processing programs 8d are stored in the program memory. A predetermined time memory 8c is stored in the data memory.

The medium in which the above-mentioned programs are recorded also falls within the scope of the present invention. A recording medium 12 is, for example, a CD-ROM which is removably attached to a main body of the apparatus via a program reading section 30. An execution format program which is read and executed by the main body, a source program which can the execution format program to be constructed, and an intermediate program are recorded in the recording medium 12.

In concrete, the above-mentioned range selection control program, comparison program and other processing programs are stored, and the execution format program read into the program memory by the program reading section 30 causes each section to operate and function under the control of the CPU 7.

Next, the operation of the present invention will be explained in order.

FIG. 4 shows an example of display screens of the invention. As shown in FIG. 4, the display section 3 has two independent screens 10a and 10b. This will be explained assuming a case when a screen range selection is made across the two screens by a touch pen 11a. The screens 10a and 10b are composed of tablets and are arranged such that coordinate information is input when input is made by the touch pen 11a.

Figure 2:
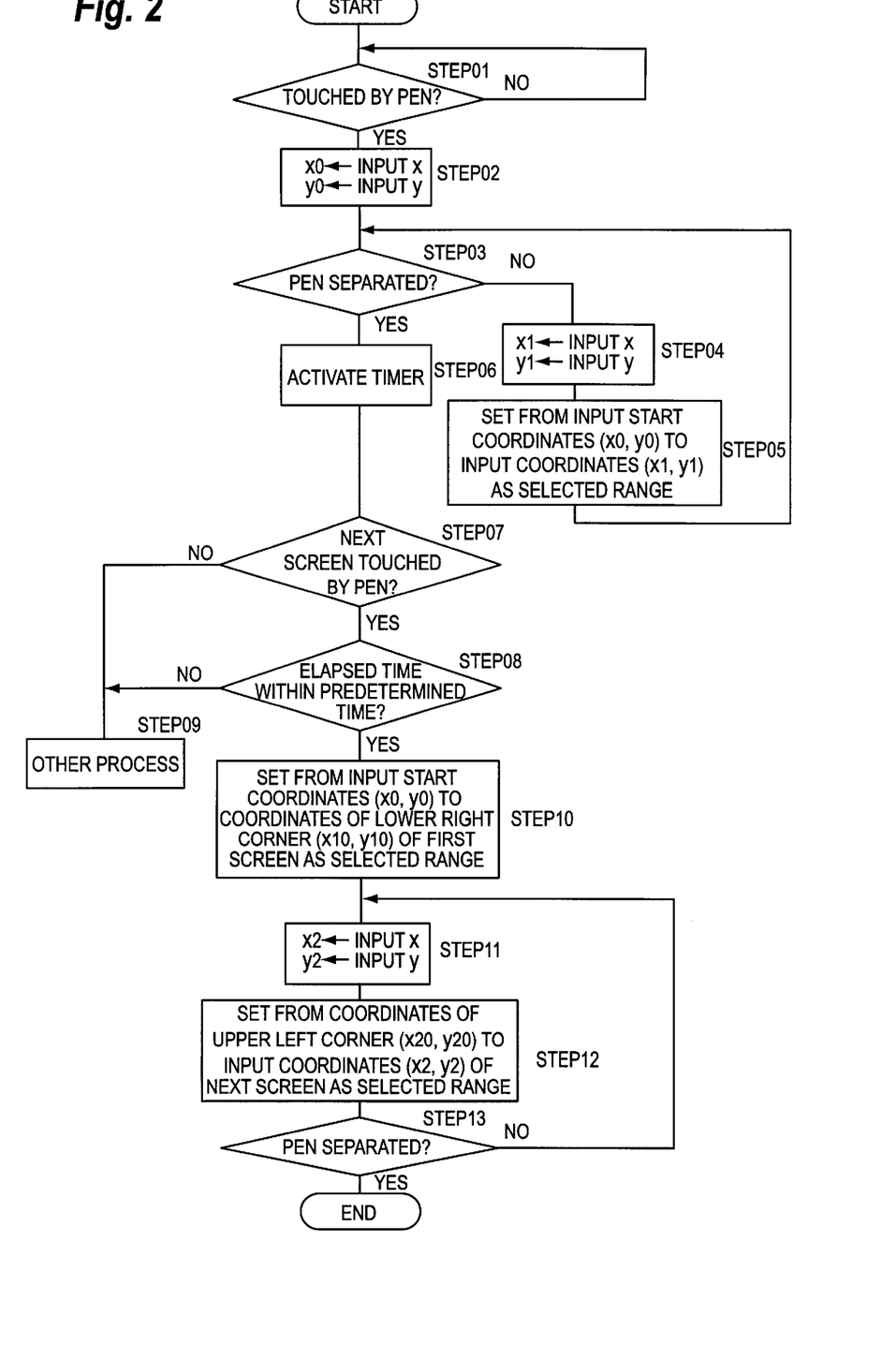
Figure 3:
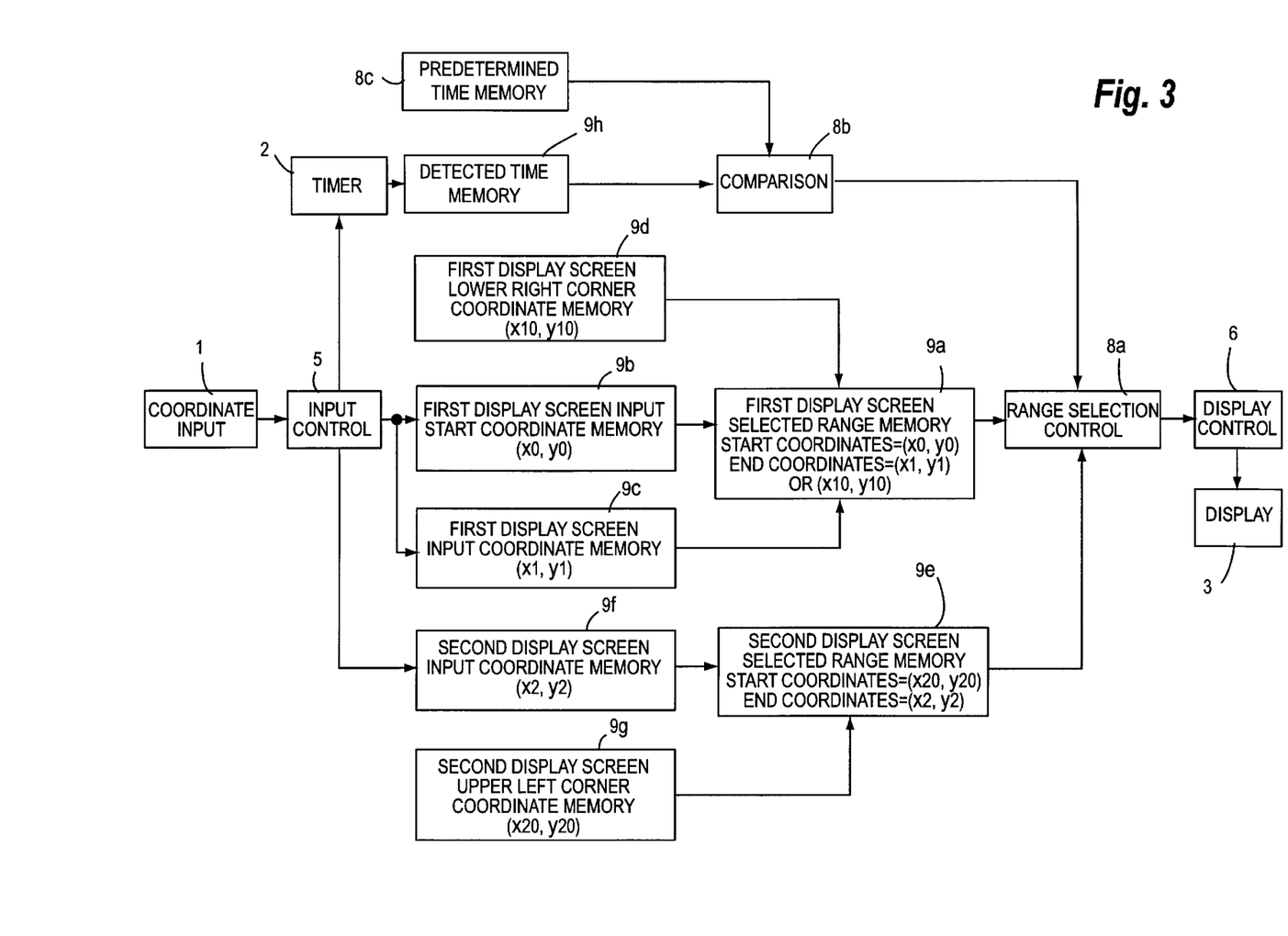

FIG. 2 is a flowchart showing processing operations of the invention and FIG. 3 is a block diagram showing processing steps of the invention. The flow of the processing will be explained in detail with reference to these figures.

It is detected by the coordinate input section 1 whether or not the touch pen 11a has touched the tablet (screen 10a) at step 01 and when the touch pen 11a has touched the tablet, the process advances to step 02.

At step 02, coordinate information of x and y where the touch pen 11a touches is detected by the coordinate input section 1 and is given to the CPU 7 by the input control section 5. The coordinate information at this time is stored as x0 and y0 in a first display screen input start coordinate memory 9b.

At step 03, it is detected by the coordinate input section 1 whether or not the touch pen 11a has been separated from the tablet (screen 10a). When the touch pen 11a is not separated from the tablet (screen 10a), the process advances to step 04. When the touch pen 11a has been separated from the tablet (screen 10a), the process advances to step 06.

At step 04, coordinate information of x and y where the touch pen 11a touches is detected by the coordinate input section 1, is given to the CPU 7 as (x1, y1) by the input control section 5 and is stored in a first display screen input coordinate memory 9c.

Then at step 05, a range from the input start coordinates (x0, y0) to the input coordinates (x1, y1) is set to be a selected range in accordance to the input coordinate information. That is, the contents of the first display screen input start coordinate memory 9b and the first display screen input coordinate memory 9c are stored in a first display screen selected range memory 9a. Then, based on the information in the first display screen selected range memory 9a, a range selecting process is carried out under the control of the range selection control section 8a, and the selected range is displayed on the display section 3 inversely, for example, under the control of the display control section 6.

Thus, the coordinate information is given to the CPU 7 while the touch pen 11a touches the tablet (screen 10a).

At step 06, the timer 2 is activated because the touch pen 11a is separated from the tablet (screen 10a).

At step 07, it is then detected by the coordinate input section 1 whether or not the touch pen 11a has touched the next screen 10b of the tablet.

At step 08, an elapsed time until when the touch pen 11a touches the tablet (screen 10b) at step 07 after activation of the timer 2 at step 06 is stored in a detection time memory 9h and the comparison section 8b determines whether or not it is within the predetermined time stored in the predetermined time memory 8c.

When the touch pen 11a did not touch the tablet (screen 10b) at step 07 or when the elapsed time is not within the predetermined time at step 08, the process advances to step 09 to implement other processes.

When the touch pen 11a touches the tablet (screen 10b) at step 07 and the elapsed time is within the predetermined time at step 08, the process advances to step 10.

At step 10, a range from the input start coordinates (x0, y0) to the coordinates at the lower right corner (x10, y10) of the first screen is set as a selected range. That is, the contents of the first display screen input start coordinate memory 9b and the first display screen lower right corner coordinate memory 9d are stored in the first display screen selected range memory 9a. Then, based on the information in the first display screen selected range memory 9a, the range selecting process is carried out under the control of the range selection control section 8a, and the selected range is displayed on the display section 3 inversely, for example, under the control of the display control section 6.

At step 11, coordinate information of x and y where the touch pen 11a touches is detected by the coordinate input section 1 and given to the CPU 7 by the input control section 5. The coordinate information at this time is stored in a second display screen input coordinate memory 9f as x2 and y2.

At step 12, a range from the coordinates at the upper left corner (x20, y20) to the input coordinates (x2, y2) of the next screen is set as a selected range. That is, the contents of the second display screen input coordinate memory 9f and the second display screen upper left corner coordinate memory 9g are stored in the second display screen selected range memory 9e. Then, based on the information in the second display screen selected range memory 9e, the range selecting process is carried out under the control of the range selection control section 8a, and the selected range is displayed on the display section 3 inversely, for example, under the control of the display control section 6.

At step 13, it is then detected by the coordinate input section 1 whether or not the touch pen 11a has been separated from the tablet (screen 10b). When the touch pen 11a has not been separated from the tablet (screen 10b), the process returns to step 11 to detect the coordinate information of x and y where the touch pen 11a touches by the coordinate input section 1 and to give it to the CPU 7 by the input control section 5.

Thus, the coordinate information is continuously given to the CPU 7 by the input control section 5 while the touch pen 11a touches the tablet (screen 10b). The processing operation is finished when the touch pen 11a is separated from the tablet (screen 10b).

As described above, the coordinate input section 1 activates the timer 2 when the touch pen is separated once from the tablet, and detects the time until when the next screen is touched by the touch pen. When the next screen is touched by the touch pen within the predetermined time, it is determined that the input by the touch pen is not finished yet on the first screen and the process is carried out continuously straddling the two screens.

A case of selecting a range as a selected range straddling the two screens will be explained concretely with reference to FIG. 4. The tablet is touched by the touch pen 11a from position P1 to position P2 within the screen 10a and the touch pen 11a is separated from the screen 10a once at position P2. Then, the touch pen 11a touches the tablet at position P3 of the screen 10b within the predetermined time and slides into position P4. Thereby, hatched portions straddling the screens 10a and 10b may be selected. When the next screen (screen 10b) is touched after a time elapsed more than the predetermined time, it is determined that the input has been finished in the screen 10a and no continuous process is carried out between the screens.

Next, a second embodiment will be explained.

Figure 5:
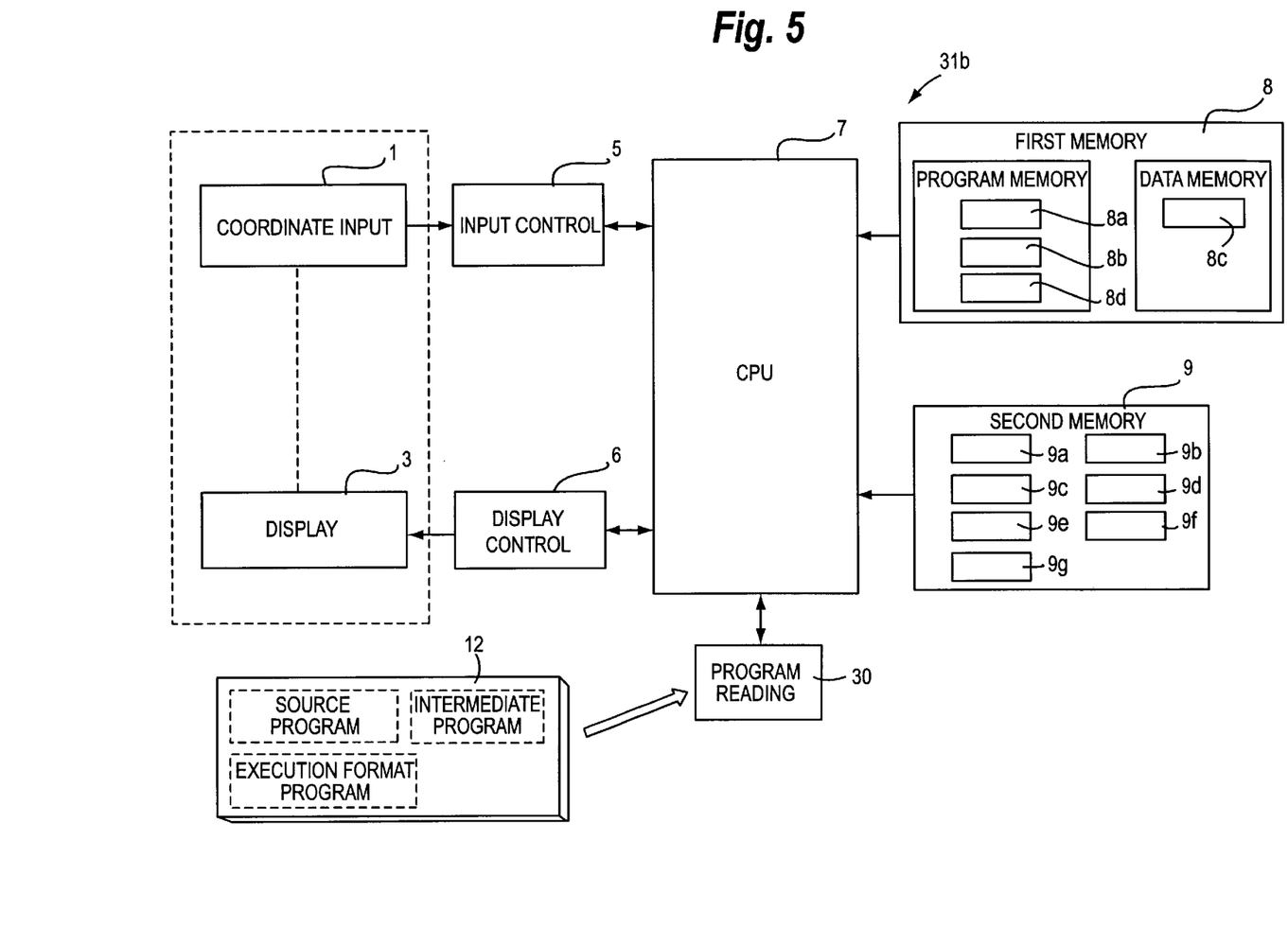
FIG. 5 is a block diagram showing a structure of an information processing terminal 31b according to a second embodiment of the present invention.
Figure 6:
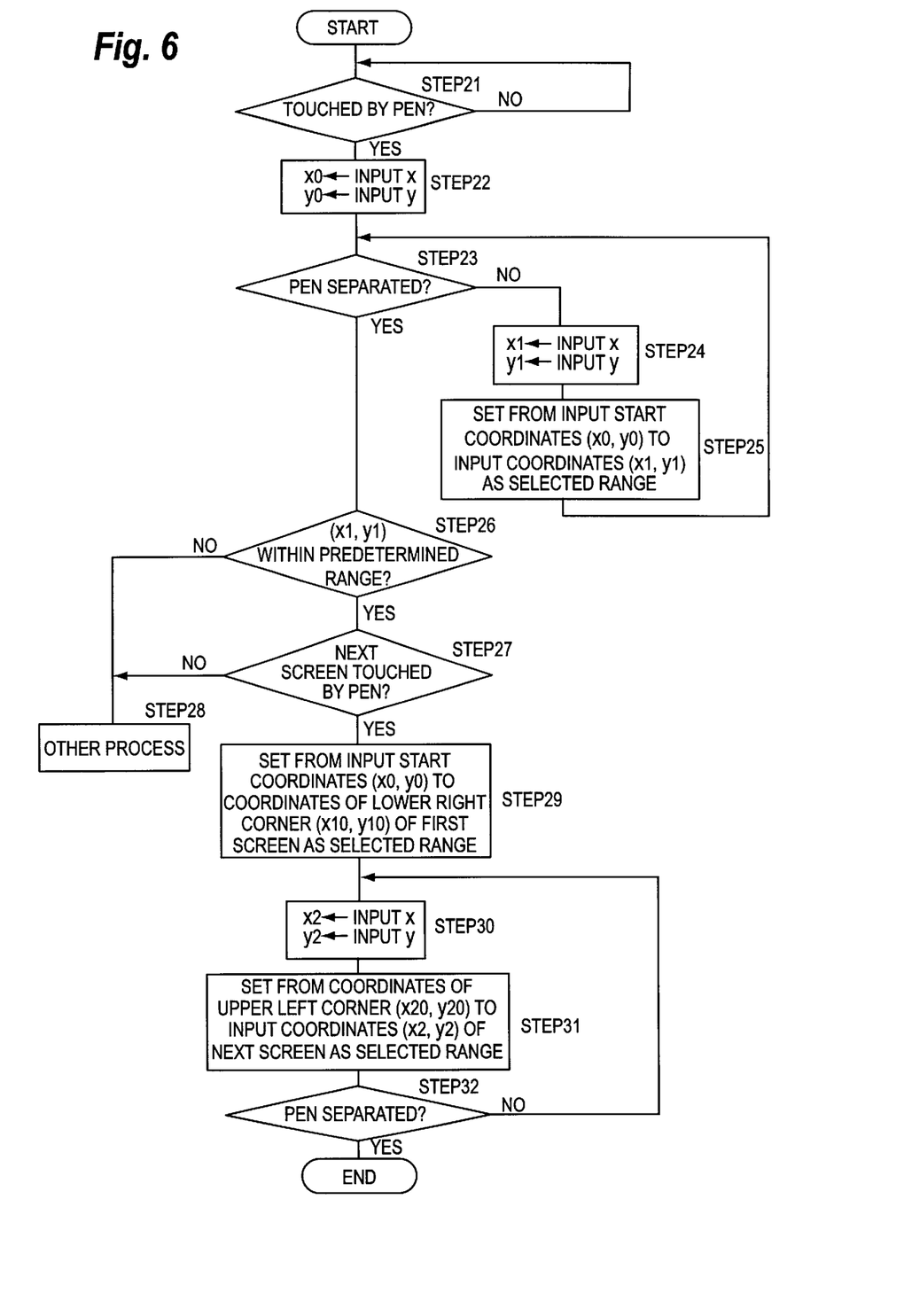
FIG. 6 is a flowchart showing coordinate input processing operations of the information processing terminal 31b.
Figure 7:
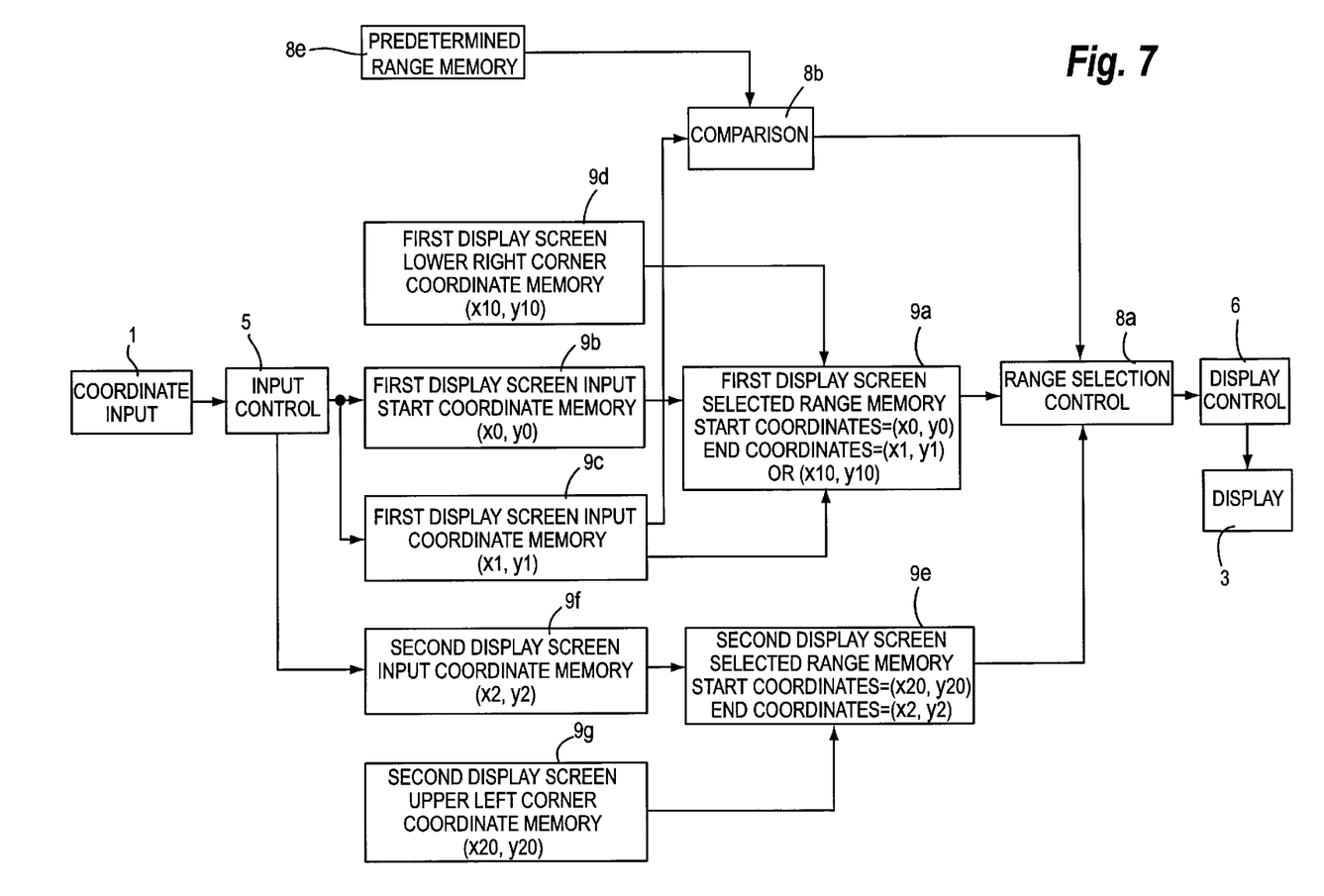
FIG. 7 is a block diagram showing a detailed structure of the information processing terminal 31b.

Similarly to FIG. 1, FIG. 5 is a block diagram showing a structure of an information processing terminal 31b of the present invention. Each construction thereof is almost the same with that shown in FIG. 1. The points of differences between the two are that the terminal 31b does not require the timer 2 unlike the terminal 31a in FIG. 1 and that the contents of the first memory 8 and second memory 9 are partly different. FIG. 6 is a flowchart showing processing operations thereof and FIG. 7 is a processing block diagram.

At step 21, it is detected by the coordinate input section 1 whether or not the touch pen 11a has touched the tablet (screen 10a) and when the touch pen 11a has touched the tablet, the process advances to step 22.

At step 22, coordinate information of x and y where the touch pen 11a touches is detected by the coordinate input section 1 and given to the CPU 7 by the input control section 5. The coordinate information at this time is stored as x0 and y0 in a first display screen input start coordinate memory 9b.

At step 23, it is detected by the coordinate input section 1 whether or not the touch pen 11a has been separated from the tablet (screen 10a). When the touch pen 11a is not separated from the tablet (screen 10a), the process advances to step 24. When the touch pen 11a has been separated from the tablet (screen 10a), the process advances to step 26.

At step 24, coordinate information of x and y where the touch pen 11a touches is detected by the coordinate input section 1, and given to the CPU 7 as (x1, y1) by the input control section 5 and then stored in a first display screen input coordinate memory 9c.

Then at step 25, the range from the input start coordinates (x0, y0) to the input coordinates (x1, y1) is set to be a selected range in accordance to the input coordinate information. That is, the contents of the first display screen input start coordinate memory 9b and the first display screen input coordinate memory 9c are stored in the first display screen selected range memory 9a. Then, based on the information in the first display screen selected range memory 9a, a range selecting process is carried out under the control of the range selection control section 8a and the selected range is displayed on the display section 3 inversely, for example, under the control of the display control section 6. Thus, the coordinate information is given to the CPU 7 while the touch pen 11a touches the tablet (screen 10a).

At step 26, it is determined by the comparison section 8b whether or not the coordinates (x1, y1) at the moment of time when the touch pen 11a has been separated from the tablet (screen 10a) are within a predetermined range of the predetermined range memory 8e.

At step 27, it is then detected whether or not the touch pen 11a has touched the next screen 10b of the tablet.

When the coordinates (x1, y1) at the moment of time when the touch pen 11a has been separated from the tablet (screen 10a) are not within the predetermined range at step 26 or the touch pen 11a did not touch the tablet (screen 10b) at step 27, the process advances to step 28 to implement other processes.

When the coordinates (x1, y1) at the moment of time when the touch pen 11a has been separated from the tablet (screen 10a) are within the predetermined range at step 26 and the touch pen 11a touches the tablet (screen 10b) at step 27, the process advances to step 29.

At step 29, a range from the input start coordinates (x0, y0) to the coordinates at the lower right corner (x10, y10) of the first screen is set as a selected range. That is, the contents of the first display screen input start coordinate memory 9b and the first display screen lower right corner coordinate memory 9d are stored in the first display screen selected range memory 9a. Then, based on the information in the first display screen selected range memory 9a, the range selecting process is carried out under the control of the range selection control section 8a, and the selected range is displayed on the display section 3 inversely, for example, under the control of the display control section 6.

At step 30, coordinate information of x and y where the touch pen 11a touches is detected by the coordinate input section 1 and given to the CPU 7 by the input control section 5. The coordinate information at this time is stored in a second display screen input coordinate memory 9f as x2 and y2.

At step 31, a range from the coordinates at the upper left corner (x20, y21) to the input coordinates (x2, y2) of the next screen is set as a selected range. That is, the contents of the second display screen input coordinate memory 9f and the second display screen upper left corner coordinate memory 9g are stored in the second display screen selected range memory 9e. Then, based on the information in the second display screen selected range memory 9e, the range selecting process is carried out under the control of the range selection control section 8a and the selected range is displayed on the display section 3 inversely, for example, under the control of the display control section 6.

At step 32, it is then detected by the coordinate input section 1 whether or not the touch pen 11a has been separated from the tablet (screen 10b). When the touch pen 11a has not been separated from the tablet (screen 10b), the process returns to step 30 to detect coordinate information of x and y where the touch pen 11a touches by the coordinate input section 1 and to give it to the CPU 7 by the input control section 5.

Thus, the coordinate information is continuously given to the CPU 7 by the input control section 5 while the touch pen 11a touches the tablet (screen 10b). The processing operation is finished when the touch pen 11a is separated from the tablet (screen 10b).

As described above, when the touch pen 11a is separated once from the tablet in the first screen, the coordinate input section 1 detects the coordinates of the position where the pen is separated. When the coordinates of that position are within the preset range and when the next screen is touched by the touch pen in succession, it is determined that the input by the touch pen is not finished yet on the first screen and the process is carried out continuously straddling the two screens.

Figure 8:
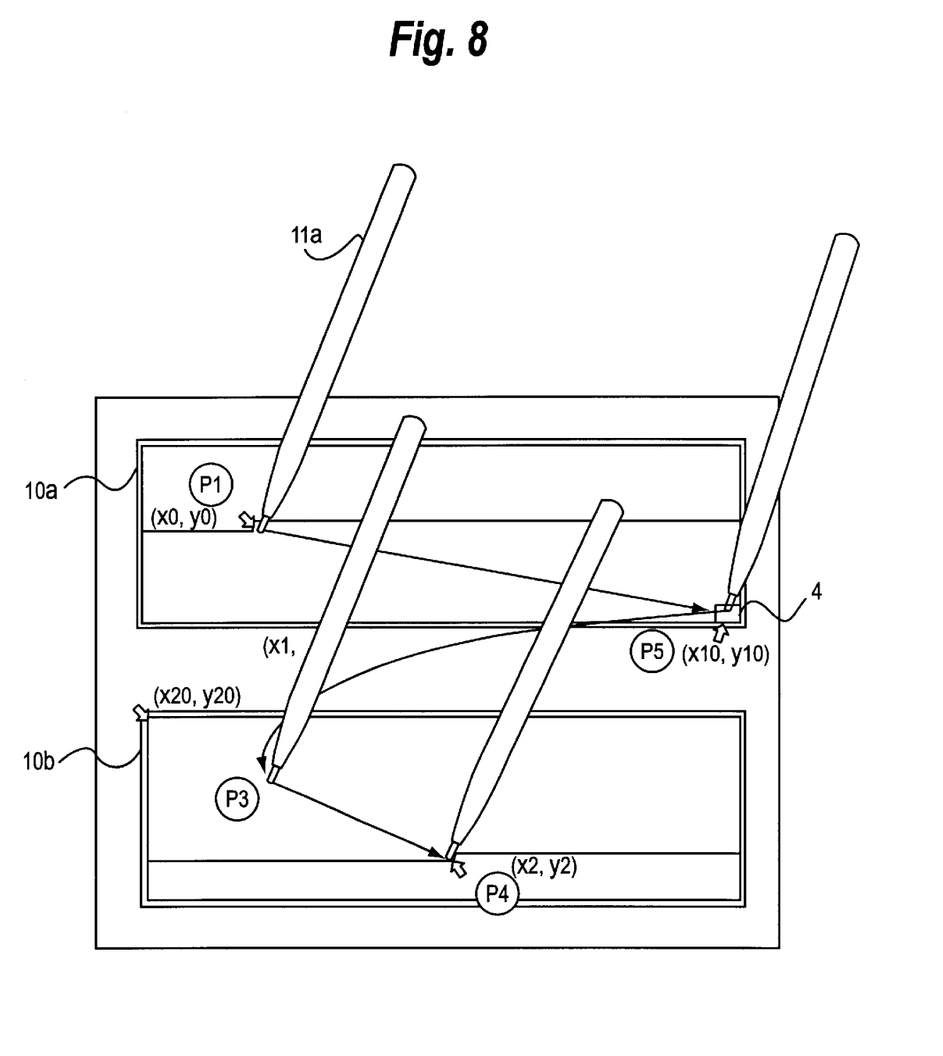
FIG. 8 shows an example of display of the information processing terminal 31b.

FIG. 8 is an illustration of selecting a range concretely as a selected range straddling the two screens. The tablet is touched by the touch pen 11a from position P1 to position P5 of the pen within a specific region 4 within the screen 10a and the touch pen 11a is separated from the screen 10a once within the specific region 4. Then, the touch pen 11a touches the tablet at position P3 of the screen 10b and slides into position P4. Thereby, hatched portions straddling the screens 10a and 10b may be selected. When the next screen (screen 10b) is touched after the touch pen 11a is separated once from the screen 10a other than the specific region on the screen 10a, it is determined that the input has been finished on the screen 10a and no continuous process is carried out among the screens.

Although the specific region 4 has been set as a predetermined region at the lower right corner of the screen here, it is also possible to set it at any position from the left edge to the right edge as long as it is on the lowermost line of the screen. Further, the methods for inputting coordinates explained in the first and second embodiments also fall within the scope of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A coordinate input apparatus for inputting coordinate information of a plurality of input faces by specifying coordinate positions, comprising:

time measuring means for measuring a time from an end of a first input on a first input face to a start of a second input on a second input face, wherein said first and second input faces are spaced apart and physically separated from one another;

judging means for judging whether or not the time measured by the time measuring means is within a predetermined time;

means for determining whether or not to recognize the first and second inputs as one continuous input based at least in part upon whether the time is judged to be within the predetermined time by the judging means; and wherein coordinates at a lower right hand corner of the first input face are set as an end of a selected range for a first screen and coordinates at an upper left hand corner of the second input face are set as an origin of a selected range for a second screen.

2. A coordinate input apparatus for inputting coordinate information of a plurality of input faces by specifying coordinate positions, comprising:

judging means for judging whether or not a position where a first input has been ended on a first input face is within a predetermined region;

means for determining whether or not to recognize the first input and a second input following the first input, on a second input face, as one continuous input based at least upon whether the position where the first input has been ended is determined to be within the predetermined region by the judging means, and wherein said first and second input faces are spaced apart and physically separated from one another; and wherein coordinates at a lower right hand corner of the first input face are set as an end of a selected range for a first screen and coordinates at an upper left hand corner of the second input face are set as an origin of a selected range for a second screen.

3. A coordinate input method for inputting coordinate information of a plurality of input faces by specifying coordinate positions comprises the steps of:

measuring a time from an end of a first input on a first input face to a start of a second input on a second input face, and wherein said first and second input faces are spaced apart and physically separated from one another;

judging whether or not the time measured at the time measuring step is within a predetermined time;

determining whether or not to recognize the first and second inputs as one continuous input based at least upon whether the time is judged to be within the predetermined time at the judging step; and wherein coordinates at a lower right hand corner of the first input face are set as an end of a selected range for a first screen and coordinates at an upper left hand corner of the second input face are set as an origin of a selected range for a second screen.

4. A coordinate input method for inputting coordinate information of a plurality of input faces by specifying coordinate positions comprises the steps of:

judging whether or not a position where a first input has been ended on a first input face is within a predetermined region; and determining whether or not to recognize the first input and a second input following the first input, on a second input face, as one continuous input based at least in part upon whether the position where the first input has been ended is determined to be within the predetermined region at the judging step, and wherein said first and second input faces are spaced apart and physically separated from one another, wherein coordinates at a lower right hand corner of the first input face are set as an end of a selected range for a first screen and coordinates at an upper left hand corner of the second input face are set as an origin of a selected range for a second screen.

5. A computer-readable recording medium comprising a coordinate input control program recorded therein for causing a computer in which coordinate information of a plurality of spaced apart input faces can be input by specifying coordinate positions, to execute:

a time measuring procedure of measuring a time from an end of a first input on a first input face to a start of a second input on a second input face that is spaced apart from the first input face;

a judging procedure of judging whether or not the time measured in the time measuring procedure is within a predetermined time;

an input controlling procedure of determining whether or not to recognize the first and second inputs as one continuous input based at least in part upon whether the time is judged to be within the predetermined time in the judging procedure; and wherein coordinates at a lower right hand corner of the first input face are set as an end of a selected range for a first screen and coordinates at an upper left hand corner of the second input face are set as an origin of a selected range for a second screen.

6. A computer-readable recording medium comprising a coordinate input control program recorded therein for causing a computer in which coordinate information of a plurality of input faces can be inputted by specifying coordinate positions, to execute:

a judging procedure of judging whether or not a position where a first input has been ended on a first input face is within a predetermined region; and an input controlling procedure of determining whether or not to recognize the first input and a second input following the first input, on a second input face, as one continuous input based at least upon whether the position where the first input has been ended is determined to be within the predetermined region in the judging procedure, and wherein said first and second input faces are spaced apart and physically separated from one another and wherein coordinates at a lower right hand corner of the first input face are set as an end of a selected range for a first screen and coordinates at an upper left hand corner of the second input face are set as an origin of a selected range for a second screen.

7. A coordinate input method for inputting coordinate information of a plurality of input areas by specifying coordinate positions comprises the steps of:

providing first and second distinct coordinate input areas in which coordinates may be input via a pointer, wherein the first input area comprises a first coordinate system and the second input area comprises a second and different coordinate system;

measuring a time from an end of a first input in the first input area to a start of a second input in the second input area;

determining whether or not the time measured at the time measuring step is less than a predetermined value; and determining whether or not to recognize the first and second inputs as one continuous input based at least upon whether the time is judged to be less than the predetermined value, wherein coordinates at a lower right hand corner of the first input face are set as an end of a selected range for a first screen and coordinates at an upper left hand corner of the second input face are set as an origin of a selected range for a second screen.

8. A coordinate input method for inputting coordinate information of a plurality of input areas by specifying coordinate positions comprises the steps of:

providing first and second distinct coordinate input areas in which coordinates may be input via a pointer, wherein the first input area comprises a first coordinate system and the second input area comprises a second coordinate system different from the first coordinate system;

determining whether or not a first input in the first input area ended within a predetermined region of the first input area; and determining whether or not to recognize the first input, and a second input in the second input area performed subsequent to the first input, as a continuous input based at least upon whether the first input is determined to have ended in the first input area within the predetermined region, and wherein said first and second input faces are spaced apart and physically separated from one another and wherein coordinates at a lower right hand corner of the first input face are set as an end of a selected range for a first screen and coordinates at an upper left hand corner of the second input face are set as an origin of a selected range for a second screen.

9. A coordinate input apparatus for inputting coordinate information of a plurality of input faces by specifying coordinate positions, comprising:

a processor for determining whether or not a position where a first input has been ended on a first input face is within a predetermined region;

said processor further determining whether or not to recognize the first input and a second input following the first input, on a second input face that is spaced from the first input face, as one continuous input based at least upon whether the position where the first input has been ended is determined to be within the predetermined region; and wherein coordinates at a lower right hand corner of the first input face are set as an end of a selected range for a first screen and coordinates at an upper left hand corner of the second input face are set as an origin of a selected range for a second screen.

* * * * *